United States Patent [19]

Rodgers

[11] Patent Number: 4,936,097
[45] Date of Patent: Jun. 26, 1990

[54] TURBOCHARGER-GAS TURBINE

[75] Inventor: Colin Rodgers, San Diego, Calif.

[73] Assignee: Sundstrand Corporation, Rockford, Ill.

[21] Appl. No.: 268,063

[22] Filed: Nov. 7, 1988

[51] Int. Cl.[5] .............................................. F02B 37/00
[52] U.S. Cl. ...................................... 60/606; 60/605.1; 417/406
[58] Field of Search ................. 60/605.1, 606; 417/406

[56] References Cited

U.S. PATENT DOCUMENTS

| | | | |
|---|---|---|---|
| 2,669,090 | 2/1954 | Jackson | 60/606 |
| 3,450,109 | 6/1969 | Gratzmuller | |
| 3,676,999 | 7/1972 | Oldfield | 60/606 |
| 3,849,988 | 11/1974 | Melchior | 60/606 |
| 3,874,824 | 4/1975 | Cronstedt et al. | 417/406 |
| 4,521,155 | 6/1985 | Osborn | 417/406 X |
| 4,559,783 | 12/1985 | Ampferer | 60/605.1 |
| 4,616,481 | 10/1986 | Melchior et al. | 60/606 |

*Primary Examiner*—Michael Koczo
*Attorney, Agent, or Firm*—Wood, Phillips, Mason, Recktenwald & Vansanten

[57] ABSTRACT

A turbocharger-gas turbine for an internal combustion engine operable in multiple modes in a manner reducing heat losses. The turbocharger-gas turbine includes a compressor for delivering compressed air to the internal combustion engine. The compressor has a compressor housing defining an air flow path leading from an air inlet to an air outlet at opposite ends thereof. The air outlet of the compressor is in communication with an air inlet of the internal combustion engine to deliver compressed air thereto. The turbocharger-gas turbine also includes a turbine for driving the compressor to compress air for delivery to the internal combustion engine. The turbine has a turbine housing defining a gas flow path leading from a gas inlet to a gas outlet at opposite ends thereof. The gas inlet of the turbine is in communication with the gas outlet of the internal combustion engine for receiving gas therefrom. The turbocharger-gas turbine further includes an auxiliary burner for increasing the energy of gas passing through the turbine. The auxiliary burner is operatively associated with the gas inlet of the turbine and the turbine housing is disposed substantially entirely within the compressor housing. With this arrangement, the turbine housing is cooled by air passing through the compressor housing from the air inlet to the air outlet thereof.

21 Claims, 1 Drawing Sheet

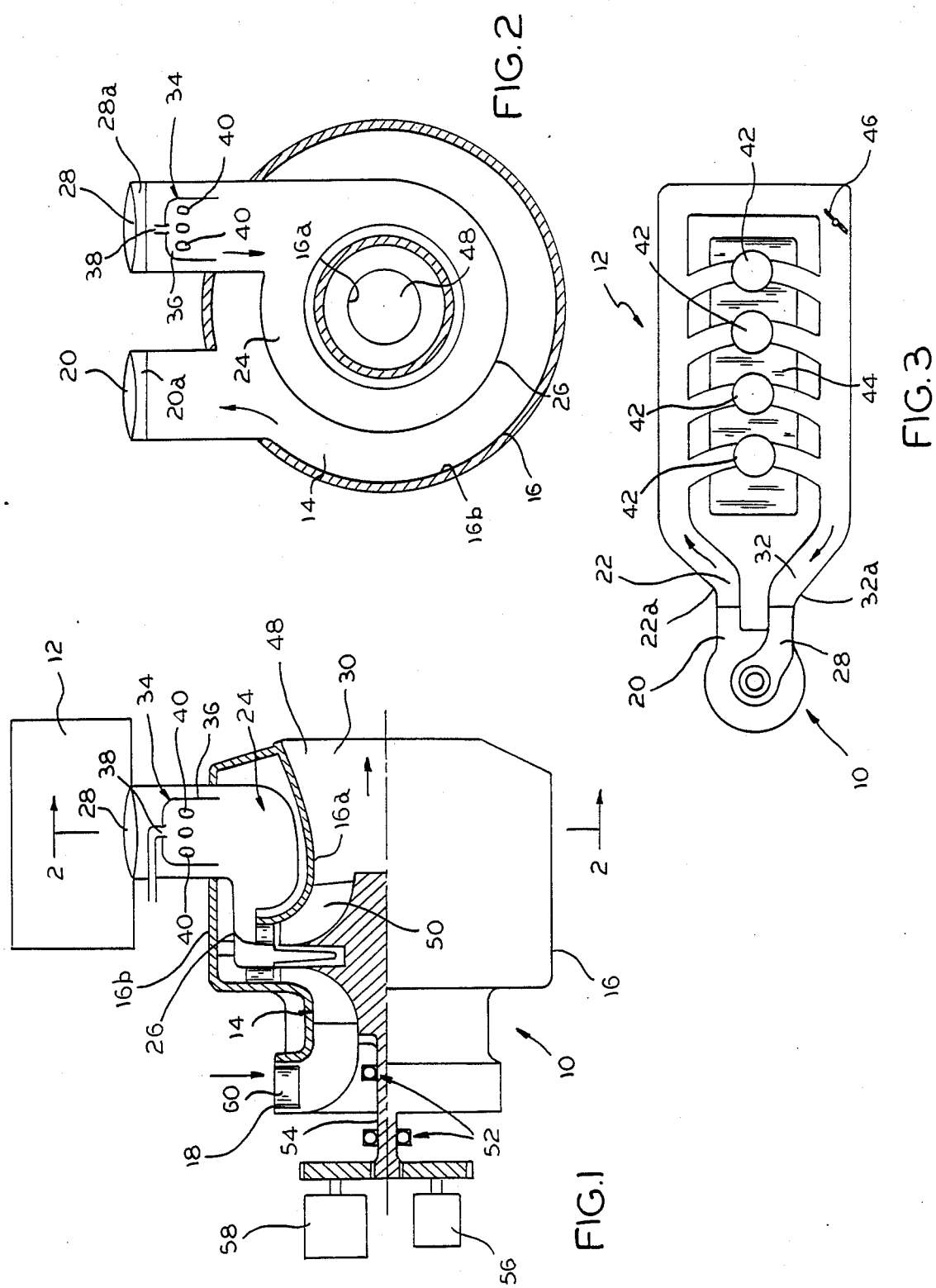

TURBOCHARGER-GAS TURBINE

FIELD OF THE INVENTION

The present invention generally relates to turbocharger-gas turbines and, more particularly, to a turbocharger-gas turbine for an engine operable in multiple modes.

BACKGROUND OF THE INVENTION

A well known feature of internal combustion engines of the diesel type is their relatively high compression ratio. This is required in order to raise the temperature of the air contained in the cylinders in the final compression stage to a value high enough to accomplish ignition of liquid fuel injected into the cylinders but, unfortunately, this is most difficult to accomplish under some conditions. In particular, it is difficult to raise the temperature of the air to a sufficiently high value to accomplish fuel ignition at start-up in low ambient temperatures.

Generally speaking, it is recognized that starting characteristics can be considerably improved by supplying hot air to the inlet manifold in severe start-up conditions. It has also been known that the power of diesel engines can be increased by introducing a greater mass of combustion air into the cylinders. In addition, it is recognized that a compressor for this purpose may be driven by a turbine to provided a greater mass of combustion air.

By way of example, Melchior U.S. Pat. No. 3,849,988 discloses a turbine-compressor unit for a diesel engine. The turbine is driven by a separate combustor that receives oxygen-poor gas from the diesel engine and oxygen-rich gas from the compressor with the relative proportions being dependent upon the speed of operation. Unfortunately, there is no means for cooling the combustor and/or turbine in a manner reducing external heat losses.

For this reason, Melchior has failed to optimize the operating characteristics of the diesel engine by reason of the heat losses. Similarly, Gratzmuller U.S. Pat. No. 3,450,109 discloses the desirability of a combustor for a supercharged diesel engine but, again, the combustor is entirely separate from the compressor and turbine with no means of avoiding external heat losses. As a result, Gratzmuller has also failed to optimize the operating characteristics of the diesel engine.

In contrast, Jackson U.S. Pat. No. 2,669,090 discloses a combustion chamber for driving a turbine which employs a flame tube spaced from an enclosing housing. Air is admitted under pressure to the enclosing housing for supporting combustion and for cooling the housing and the flame tube as well as the combustion gases. However, once again the combustor is separate from the turbine, heat losses from the turbine are still present, and performance of the engine is not optimal.

For these reasons, it is an object of the present invention to provide a turbocharger-gas turbine for an internal combustion engine. It is a further object of the present invention to provide such a turbocharger-gas turbine which is operable in multiple modes, i.e., a first, or starting, mode, a second, or normal running, mode, and a third, or power boost, mode. Further, it is an object of the present invention to reduce heat losses by providing a relatively cool blanket of air around the outer skin and auxiliary burner-containing turbine assembly.

The present invention is directed to overcoming the above stated problems and accomplishing the above stated objects.

SUMMARY OF THE INVENTION

Accordingly, the present invention is directed to a turbocharger-gas turbine for an internal combustion engine operable in multiple modes. The turbocharger-gas turbine includes a compressor for delivering compressed air to the internal combustion engine extending from an air inlet to an air outlet at opposite ends thereof. The air outlet of the compressor is in communication with an air inlet of the internal combustion engine to deliver compressed air thereto. The turbocharger-gas turbine also includes a turbine for driving the compressor to compress air for delivery to the internal combustion engine. The turbine has a turbine housing defining a gas flow path extending from a gas inlet to a gas outlet at opposite ends thereof. The gas inlet of the turbine is in communication with a gas outlet of the internal combustion engine for receiving gas therefrom. The turbocharger-gas turbine further includes an auxiliary burner for increasing the energy of gas passing through the turbine. The auxiliary burner is operatively associated with the gas inlet of the turbine and the turbine housing is disposed substantially entirely within the compressor housing. With this arrangement, the turbine housing is cooled by air passing through the compressor housing from the air inlet to the air outlet thereof.

In the preferred embodiment, the auxiliary burner is disposed in the gas inlet of the turbine. The auxiliary burner suitably includes an inverted burner can positioned so as to lie within the gas flow path in the turbine housing and formed to include an inlet for injecting a fuel at the upstream end thereof. Preferably, the burner also includes a plurality of perforations for admitting a gas for combustion with the fuel.

Further, the turbine housing preferably includes a generally annular main body portion with the gas inlet extending generally tangentially thereof. Similarly, the compressor housing preferably includes a generally annular main body portion with the air outlet extending generally tangentially thereof.

With this arrangement, the turbine housing is positioned with its main body portion generally concentric to the main body portion of the compressor housing.

In the preferred embodiment, the internal combustion engine includes a primary air flow path extending therethrough and a secondary air flow path extending thereabout. With this arrangement, the internal combustion engine includes a modulated bleed valve in the secondary air flow path to control the magnitude of air flowing through the primary and secondary air flow paths.

Still additional details include a cool end bearing assembly supported by the compressor housing and the turbine housing in cantilevered fashion at a point remote from the internal combustion engine. It is also advantageous for the air outlet of the compressor and the gas inlet of the turbine to each include a flange adapted to telescopically engage respective projections defining the air inlet and gas outlet of the internal combustion engine. With the air inlet and gas outlet of the internal combustion engine disposed in spaced parallel relation, the air outlet of the compressor and the gas inlet of the turbine can be similarly disposed in spaced parallel relation to provide a quick connect and disconnect system.

In the preferred embodiment, the turbocharger-gas turbine is adapted for a diesel engine which is operable in multiple modes. Advantageously, the compressor housing includes an innermost body portion radially inwardly of the main body portion of the turbine housing and an outermost body portion radially outwardly thereof to achieve cooling of the turbine housing and, thus, the auxiliary burner by air passing through the compressor housing from the air inlet to the air outlet thereof. With this arrangement, the turbine can include an annular exhaust duct extending through the innermost body portion of the compressor housing.

Other objects, advantages, and features of the present invention will become apparent from the following specification taken in conjunction with the accompanying drawings.

BRIEF DESCRIPTION OF THE DRAWINGS

FIG. 1 is a side elevational view, partially in section and partially schematic, illustrating a turbocharger-gas turbine for an internal combustion engine in accordance with the present invention;

FIG. 2 is a cross sectional view taken on the line 2—2 of FIG. 1 illustrating the compressor and turbine; and FIG. 3 is a schematic cross sectional view, illustrating a turbocharger-gas turbine for an internal combustion engine in accordance with the present invention.

DETAILED DESCRIPTION OF THE PREFERRED EMBODIMENT

Referring to the drawings, and first to FIG. 1, the reference numeral 10 designates a turbocharger-gas turbine for an internal combustion engine 12 operable in multiple modes. The turbocharger-gas turbine 10 includes a compressor 14 for delivering compressed air to the internal combustion engine 12. The compressor 14 has a compressor housing 16 (see FIG. 2) defining an air flow path therethrough. The compressor housing 16 includes an air inlet 18 and an air outlet 20 at opposite ends of the air flow path. With this arrangement, the air outlet 20 is in communication with an air inlet 22 of the internal combustion engine 12 to deliver compressed air thereto (see FIG. 3).

As shown in FIG. 1, the turbocharger-gas turbine 10 also includes a turbine 24 for driving the compressor 14 to compress air for delivery to the internal combustion engine 12. The turbine 24 has a turbine housing 26 (see FIG. 2) defining a gas flow path therethrough. The turbine housing 26 has a gas inlet 28 and a gas outlet 30 at opposite ends of the gas flow path. With this arrangement, the gas inlet 28 of the turbine 24 is in communication with a gas outlet 32 of the internal combustion engine 12 for receiving gas therefrom.

Referring specifically to FIGS. 1 and 2, the turbocharger-gas turbine 10 further includes auxiliary burner 34 for increasing the energy of gas passing through the turbine 24. The auxiliary burner 34 is operatively associated with the gas inlet 28 of the turbine 24 and the turbine housing 26 is disposed substantially entirely within the compressor housing 16. Being so configured, the turbine housing 26 is cooled by air passing through the compressor 14 from the air inlet 18 to the air outlet 20 thereof.

In the preferred embodiment, the auxiliary burner 34 is disposed within the gas inlet 28 of the turbine 24 and preferably comprises an inverted burner can 36. It will be seen that the burner can 34 is positioned so as to lie within the gas flow path in the turbine housing 26 and formed so as to include an inlet 38 for injecting a fuel at the upstream end thereof. Also as shown, the burner can 36 is formed to include a plurality of perforations 40 for admitting a gas for combustion with the fuel.

As will be appreciated by referring to FIG. 3, the internal combustion engine 12 includes a primary air flow path and a secondary air flow path extending from the air inlet 22 to the gas outlet 32. The primary air flow path extends from the air inlet 22, through the cylinders 42 of the engine 12, and to the gas outlet 32 whereas the secondary air flow path extends from the air inlet 22, completely about the block 44 containing the cylinders 42, and to the gas outlet 32. With this arrangement, the internal combustion engine 12 includes a modulated bleed valve 46 preferably disposed in the secondary air flow path to control the magnitude of air flowing through the primary and secondary air flow paths.

Referring to FIG. 3, the air inlet 22 and gas outlet 32 of the internal combustion 12 are disposed in spaced parallel relation. It will also be seen from FIG. 2 that the air outlet 20 of the compressor 14 and the gas inlet 28 of the turbine 24 each include a flange 20a and 28a, respectively, which may be of any conventional configuration and/or construction and which are adapted to telescopically engage or receive respective projections 22a and 32a defining the air inlet 22 and gas outlet 32 of the internal combustion engine 12 the latter also of conventional configuration and/or construction. For this purpose, the air outlet 20 of the compressor 14 and the gas inlet 28 of the turbine 24 are also disposed in spaced parallel relation.

As best shown in FIG. 2, the compressor housing 16 includes a generally annular main body portion with the air outlet 20 extending generally tangentially thereof and the turbine housing 26 also includes a generally annular main body portion with the gas inlet 28 extending generally tangentially thereof. It will also be seen that the main body portion of the compressor housing 16 is generally concentric with the main body portion of the turbine housing 26. As will be appreciated from the drawings, the compressor housing 16 includes an innermost body portion 16a disposed at a position radially inwardly of the main body portion of the turbine housing 26 and an outermost body portion 16b disposed at a position radially outwardly thereof.

With this arrangement, the turbine 24 is preferably formed with an annular exhaust duct 48 extending through and defined by the innermost body portion 16a of the compressor housing 16. It will thus be seen that gas exiting the internal combustion engine 12 through the gas outlet 32 and entering the gas inlet 28 of the turbine 24 will pass through the turbine housing 24, through turbine blades 50, and through the exhaust duct 48. By reason of the construction of the turbocharger-gas turbine 10, the turbine housing 26 is at the same time cooled by air passing through the compressor housing 16 from the air inlet 18 to the air outlet 20 thereof.

In the preferred embodiment, a cool end bearing assembly 52 is supported by the compressor housing 16 and the turbine housing 26 as illustrated in FIG. 1. It will further be noted that the compressor housing 16 and the turbine housing 26 are supported on the shaft 54 in cantilevered fashion at a point remote from the internal combustion engine 12. Also as shown, a starter 56 and a generator 58 can be operatively associated with the shaft 54 adjacent the cool end bearing assembly 52.

From the foregoing, it will be appreciated that the turbocharger-gas turbine 10 is well suited for use with a diesel engine 12. As air flows into the air inlet 18 past the inlet guide vanes 60, the compressor 14 directs the air into the volume surrounding the turbine housing 26 and, thus, the auxiliary burner 34 to provide a "cool skin design." After passing through this region, the air flows through the air outlet 20 into the air inlet 22 of the diesel engine 12.

At this point, the air can flow through the cylinders 42, i.e., the primary air flow path, or around the cylinders 42, i.e., the secondary air flow path, by passing by the modulated bleed valve 46. Whether the compressed air from the compressor 14 passes through the cylinders 42 or around the cylinders 42, it then flows into the gas inlet 28 of the turbine housing 26 and into the interior region of the auxiliary burner 34 which can be provided with fuel at the inlet 38. When fuel is provided at the inlet 38, it is burned in the burner can 34 which directs the resulting gases past the turbine blades 50 and through the exhaust duct 48.

With the turbocharger-gas turbine 10 as described, three modes of operation are available. The first, or starting, mode occurs when the cylinders 42 are not firing, e.g., at start-up in low ambient temperature conditions, when compressed air flows from the region surrounding the cool skin of the turbine housing 26 and, thus, the auxiliary burner, through both the cylinders 42 and the bypass route (or secondary air flow path) toward the gas inlet 28 of the turbine 24. In this mode, the auxiliary burner 34 can raise the energy of the gas prior to the gas passing through the turbine blades 50 to rotate the compressor 14.

The second, or normal running, mode occurs when the cylinders 42 are firing during which the modulated bleed valve 46 is closed. All of the air flowing from the air outlet 20 into the air inlet 22 will then pass through the cylinders 42, i.e., the primary air flow path, and the exhaust from the cylinders 42 will follow the primary air flow path toward the gas outlet 32 and into the gas inlet 28 of the turbine 24 and this heated air will drive the turbine 24. In this mode of operation, no fuel is provided to the auxiliary burner 34 at the inlet 38 because of the heat obtained as the air passes through the cylinders 42.

The third, or power boost, mode also occurs when the cylinders 42 are firing during which the modulated bleed valve 46 is, again, closed. All of the air flowing into the air inlet 22 will againpass through the cylinders 42 with the exhaust from the cylinders 42 flowing toward the gas inlet 28 of the turbine 24. However, in this mode of operation, fuel is provided to the auxiliary burner 34 at the inlet 38 to provide additional energy to the gas flowing through the turbine 24.

With the arrangement described in detail, the auxiliary burner 34 is disposed within a region through which air passes from the compressor housing 16 to the cylinders 42. This provides a relatively cool blanket of air around the outer skin of the turbine housing 26 in which the auxiliary burner 34 is mounted and provides a beneficial cooling effect in a manner which takes proper heed of energy conservation principles. In addition, the modulated bleed valve 46 is suitable to provide diesel engine warm-up start-up operation in a partially open position, control turbine inlet temperature in a gas turbine mode, and select a turbocharger only mode.

With the present invention, it will now be appreciated that a cool skin hot end module is provided which is bathed in compressor discharge air. It will also be appreciated that a cantilevered compressor and turbine assembly is provided wherein the assembly is cantilevered from a forward cool end bearing capsule. Moreover, the variable inlet guide vanes provide increased compressor surge margin and the compressor exit and turbine inlet flanges provide a quick connect and disconnect capacity.

While in the foregoing there has been provided a detailed descrption of the preferred embodiment, it will be understood that this description is for purposes of illustration only and the invention is only to be limited by the true spirit and scope of the appended claims.

I claim:

1. A turbocharger-gas turbine for an internal combustion engine operable in multiple modes, comprising:
   a compressor for delivering compressed air to said internal combustion engine, said compressor including a compressor housing defining an air flow path therethrough said compressor housing having an air inlet and an air outlet at opposite ends of said air flow path;
   said air outlet of said compressor being in communication with an air inlet of said internal combustion engine to deliver compressed air solely to said internal combustion engine;
   a turbine for driving said compressor to compress air for delivery to said internal combustion engine, said turbine including a turbine housing defining a gas flow path therethrough, said turbine housing having a gas inlet and a gas outlet at opposite ends of said gas flow path;
   said gas inlet of said turbine being in communication with a gas outlet of said internal combustion engine for receiving gas solely from said internal combustion engine; and
   an auxiliary burner for increasing the energy of gas passing through said turbine, said auxiliary burner being operatively associated with said gas inlet of said turbine;
   said turbine housing being disposed substantially entirely within said said compressor housing;
   whereby said turbine housing is cooled by air passing through said compressor housing from said air inlet to said air outlet thereof.

2. The turbocharger-gas turbine as defined by claim 1 wherein said auxiliary burner is disposed in said gas inlet of said turbine, said auxiliary burner including a burner can positioned so as to lie within and be inverted relative to said gas flow path in said turbine housing.

3. The turbocharger-gas turbine as defined by claim 2 wherein said burner can includes an inlet for injecting a fuel at the upstream end thereof, said burner can also including a plurality of perforations for admitting a gas for combustion with said fuel.

4. The turbocharger-gas turbine as defined by claim 1 wherein said turbine housing includes a generally annular main body portion, said gas inlet extending generally tangentially of said main body portion of said turbine housing.

5. The turbocharger-gas turbine as defined by claim 1 wherein said compressor housing includes a generally annular main body portion, said air outlet extending generally tangentially of said main body portion of said compressor housing.

6. The turbocharger-gas turbine as defined by claim 1 wherein said internal combustion engine includes a primary air flow path extending therethrough, said internal combustion engine also including a secondary air flow path extending thereabout.

7. The turbocharger-gas turbine as defined by claim 6 wherein said internal combustion engine includes a modulated bleed valve in said secondary air flow path to control the magnitude of air flowing through said primary and secondary air flow paths.

8. The turbocharger-gas turbine as defined by claim 1 including a cool end bearing assembly supported by said compressor housing and said turbine housing in cantilevered fashion at a point remote from said internal combustion engine.

9. The turbocharger-gas turbine as defined by claim 1 wherein said air outlet of said compressor and said gas inlet of said turbine are each adapted to telescopically engage respective projections defining said air inlet and gas outlet of said internal combustion engine.

10. A turbocharger-gas turbine for an internal combustion engine operable in multiple modes, comprising:
   a compressor for delivering compressed air to said internal combustion engine, said compressor including a compressor housing defining an air flow path therethrough, said compressor housing having an air inlet and an air outlet at opposite ends of said air flow path;
   said air outlet of said compressor being in communication with an air inlet of said internal combustion engine to deliver compressed air solely to said internal combustion engine;
   a turbine for driving said compressor to compress air for delivery to said internal combustion engine, said turbine including a turbine housing defining a gas flow path therethrough, said turbine housing having a gas inlet and a gas outlet at opposite ends of said gas flow path;
   said gas inlet of said turbine being in communication with a gas outlet of said internal combustion engine for receiving gas solely to said internal combustion engine; and
   an auxilary burner for increasing the energy of gas passing through said turbine, said auxiliary burner being operatively associated with said gas inlet of said turbine;
   said turbine housing being disposed substantially entirely within said said compressor housing;
   said compressor housing including a generally annular main body portion, said air outlet extending generally tangentially of said main body portion of said compressor housing;
   said turbine housing including a generally annular main body portion, said gas inlet extending generally tangentially of said main body portion of said turbine housing;
   whereby said turbine housing is cooled by air passing through said compressor housing from said air inlet to said air outlet thereof.

11. The turbocharger-gas turbine as defined by claim 10 wherein said auxiliary burner is disposed in said gas inlet of said turbine, said auxiliary burner including a burner can positioned so as to lie within and be inverted relative to said gas flow path in said turbine housing.

12. The turbocharger-gas turbine as defined by claim 11 wherein said burner can includes an inlet for injecting a fuel at the upstream end thereof, said burner can also including a plurality of perforations for admitting a gas for combustion with said fuel.

13. The turbocharger-gas turbine as defined by claim 10 wherein said internal combustion engine includes a primary air flow path extending therethrough, said internal combustion engine also including a secondary air flow path extending thereabout.

14. The turbocharger-gas turbine as defined by claim 13 wherein said internal combustion engine includes a modulated bleed valve in said secondary air flow path to control the magnitude of air flowing through said primary and secondary air flow paths.

15. The turbocharger-gas turbine as defined by claim 10 including a cool end bearing assembly supported by said compressor housing and said turbine housing in cantilevered fashion at a point remote from said internal combustion engine.

16. The turbocharger-gas turbine as defined by claim 10 wherein said air outlet of said compressor and said gas inlet of said turbine are each adapted to telescopically engage respective projections defining said air inlet and gas outlet of said internal combustion engine.

17. The turbocharger-gas turbine as defined by claim 16 wherein said air inlet and gas outlet of said internal combustion engine are disposed in spaced parallel relation, said air outlet of said compressor and said gas inlet of said turbine being similarly disposed in spaced parallel relation.

18. A turbocharger-gas turbine for a diesel engine operable in multiple modes, comprising:
   a compressor for delivering compressed air to said diesel engine, said compressor including a compressor housing defining an air flow path therethrough, said compressor housing having an air inlet and an air outlet at opposite ends of said air flow path;
   said air outlet of said compressor being in communication with an air inlet of said diesel engine to deliver compressed air solely to said diesel engine;
   a turbine for driving said compressor to compress air for delivery to said diesel engine, said turbine including a turbine housing defining a gas flow path therethrough, said turbine housing having a gas inlet and a gas outlet at opposite ends of said gas flow path;
   said gas inlet of said turbine being in communication with a gas outlet of said diesel engine for receiving gas solely to said diesel engine; and
   an auxiliary burner for increasing the energy of gas passing through said turbine, said auxiliary burner being operatively associated with said gas inlet of said turbine;
   said turbine housing being disposed substantially entirely within said compressor housing;
   said compressor housing including a generally annular main body portion, said air outlet extending generally tangentially of said main body portion of said compressor housing;
   said turbine housing including a generally annular main body portion, said gas inlet extending generally tangentially of said main body portion of said turbine housing;
   said main body portion of said compressor housing is generally concentric with said main body portion of said turbine housing, said compressor housing including an innermost body portion radially inwardly of said main body portion of said turbine housing and an outermost body portion radially outwardly thereof, said turbine including an annular exhaust duct extending through said innermost body portion of said compressor housing;

whereby said turbine housing is cooled by air passing through said compressor housing from said air inlet to said air outlet thereof.

19. The turbocharger-gas turbine as defined by claim 18 wherein said diesel engine includes a primary air flow path extending therethrough and a secondary air flow path extending thereabout, said diesel engine also including a modulated bleed valve in said secondary air flow path to control the magnitude of air flowing through said primary and secondary air flow paths extending through and about said diesel engine.

20. The turbocharger-gas turbine as defined by claim 18 wherein said air outlet of said compressor and said gas inlet of said turbine are each adapted to telescopically engage respective spaced parallel projections defining said air inlet and gas outlet of said diesel engine, said air outlet of said compressor and said gas inlet of said turbine being similarly disposed in spaced parallel relation.

21. The turbocharger-gas turbine as defined by claim 18 including a cool end bearing assembly supported by said compressor housing and said turbine housing in cantilevered fashion at a point remote from said internal combustion engine.

* * * * *